United States Patent
Roy et al.

(10) Patent No.: US 10,547,085 B2
(45) Date of Patent: Jan. 28, 2020

(54) LITHIUM SECONDARY BATTERY INCLUDING ELECTROLYTE CONTAINING MONOFLUOROSILANE COMPOUND

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Basab Roy, Hwaseong-si (KR); Myongchun Koh, Hwaseong-si (KR); Dongyoung Kim, Yongin-si (KR); Eunha Park, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 81 days.

(21) Appl. No.: 15/489,969

(22) Filed: Apr. 18, 2017

(65) Prior Publication Data
US 2018/0219258 A1  Aug. 2, 2018

(30) Foreign Application Priority Data

Jan. 31, 2017 (KR) .......... 10-2017-0014110

(51) Int. Cl.
| | |
|---|---|
| *H01M 10/0568* | (2010.01) |
| *H01M 4/131* | (2010.01) |
| *H01M 4/133* | (2010.01) |
| *H01M 4/505* | (2010.01) |
| *H01M 4/525* | (2010.01) |
| *H01M 4/583* | (2010.01) |
| *H01M 4/62* | (2006.01) |

(Continued)

(52) U.S. Cl.
CPC ....... *H01M 10/0568* (2013.01); *H01M 4/131* (2013.01); *H01M 4/133* (2013.01); *H01M 4/505* (2013.01); *H01M 4/525* (2013.01); *H01M 4/583* (2013.01); *H01M 4/623* (2013.01); *H01M 4/625* (2013.01); *H01M 4/661* (2013.01); *H01M 4/70* (2013.01); *H01M 10/0525* (2013.01); *H01M 10/0562* (2013.01); *H01M 10/0569* (2013.01); *H01M 2004/027* (2013.01); *H01M 2004/028* (2013.01); *H01M 2300/002* (2013.01); *H01M 2300/0034* (2013.01); *H01M 2300/0042* (2013.01)

(58) Field of Classification Search
CPC ...... H01M 4/131; H01M 4/133; H01M 4/505; H01M 4/525; H01M 4/583; H01M 4/623; H01M 4/625; H01M 4/661; H01M 4/70; H01M 10/0568; H01M 10/0525; H01M 10/0562; H01M 10/0567; H01M 10/0569; H01M 2004/027; H01M 2004/028; H01M 2300/002; H01M 2300/0034; H01M 2300/0042; Y02T 10/7011

See application file for complete search history.

(56) References Cited

U.S. PATENT DOCUMENTS

| | | | |
|---|---|---|---|
| 7,074,523 B2 | 7/2006 | Arai et al. | |
| 7,223,500 B2 * | 5/2007 | Noh ................. | H01M 10/0525 |
| | | | 429/199 |

(Continued)

FOREIGN PATENT DOCUMENTS

| | | |
|---|---|---|
| EP | 1258939 A2 | 11/2002 |
| EP | 1420475 A2 | 5/2004 |

(Continued)

OTHER PUBLICATIONS

Li et al.; "Trimethyl phosphite as an electrolyte additive for high-voltage lithium-ion batteries using lithium-rich layered oxide cathode"; Journal of Power Sources 240 (available online Apr. 18, 2013), pp. 471-475. (Year: 2013).*

(Continued)

*Primary Examiner* — Gregg Cantelmo
(74) *Attorney, Agent, or Firm* — Cantor Colburn LLP

(57) ABSTRACT

A lithium secondary battery including a cathode; an anode; and an electrolyte disposed between the cathode and the anode,
wherein the cathode includes a cathode active material represented by Formula 1,
the electrolyte includes a lithium salt; a non-aqueous solvent; and a monofluorosilane compound represented by Formula 2,
wherein an amount of the monofluorosilane compound is in a range of about 0.1 percent by weight (wt %) to about 5 wt % based on the total weight of the electrolyte

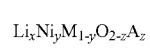
Formula 1

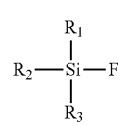

Formula 2 wherein, in Formula 1, $0.9 \leq x \leq 1.2$, $0.85 < y \leq 0.95$, and $0 \leq z < 0.2$; M is aluminum, magnesium, manganese, cobalt, iron, chromium, vanadium, titanium, copper, boron, calcium, zinc, zirconium, niobium, molybdenum, strontium, antimony, tungsten, bismuth, or a combination thereof; A is an element having an oxidation number of −1 or −2, and $R_1$ is a substituted or unsubstituted linear or branched $C_2$-$C_{30}$ alkyl group or a substituted or unsubstituted $C_6$-$C_{60}$ aryl group.

18 Claims, No Drawings

(51) Int. Cl.
*H01M 4/66* (2006.01)
*H01M 4/70* (2006.01)
*H01M 10/0525* (2010.01)
*H01M 10/0562* (2010.01)
*H01M 10/0569* (2010.01)
*H01M 4/02* (2006.01)

(56) References Cited

U.S. PATENT DOCUMENTS

| | | | |
|---|---|---|---|
| 7,244,531 B2 | 7/2007 | Kim et al. | |
| 8,187,747 B2 * | 5/2012 | Abe | C01G 53/00 |
| | | | 429/223 |
| 9,023,536 B2 | 5/2015 | Taki et al. | |
| 2010/0015514 A1 * | 1/2010 | Miyagi | H01M 4/131 |
| | | | 429/129 |
| 2011/0076572 A1 * | 3/2011 | Amine | H01M 10/05 |
| | | | 429/328 |
| 2012/0326500 A1 * | 12/2012 | Hirose | H01M 4/5825 |
| | | | 307/9.1 |
| 2013/0177822 A1 | 7/2013 | Taki et al. | |
| 2013/0252108 A1 * | 9/2013 | Richards | H01M 4/0445 |
| | | | 429/223 |
| 2014/0023932 A1 * | 1/2014 | Zhang | H01M 10/0564 |
| | | | 429/306 |
| 2015/0020351 A1 | 1/2015 | Lin | |
| 2015/0340736 A1 | 11/2015 | Kim et al. | |
| 2017/0040593 A1 | 2/2017 | Miyagi et al. | |

FOREIGN PATENT DOCUMENTS

| | | | | |
|---|---|---|---|---|
| EP | 1939971 A1 | | 7/2008 | |
| EP | 2911224 A1 | * | 8/2015 | ............ C01G 53/42 |
| JP | 2009163939 A | | 7/2009 | |
| JP | 2010238506 A | | 10/2010 | |
| JP | 2012109092 A | | 6/2012 | |
| JP | 201572856 A | | 4/2015 | |
| KR | 20080057666 A | * | 6/2008 | |
| KR | 1020130142387 A | | 12/2013 | |
| WO | 2007055087 A1 | | 5/2007 | |
| WO | 2012066878 A1 | | 5/2012 | |
| WO | 2015033454 A1 | | 3/2015 | |

OTHER PUBLICATIONS www.espacenet.com machine translation of the description of KR 2008-0057666 (Jun. 2008). (Year: 2008).*
Certified Translation of KR 20080057666A (Year: 2008).*
European Search Report for European Patent Application No. 1720547737 dated Feb. 16, 2018.

* cited by examiner

LITHIUM SECONDARY BATTERY INCLUDING ELECTROLYTE CONTAINING MONOFLUOROSILANE COMPOUND

CROSS-REFERENCE TO RELATED APPLICATION

This application claims priority to and the benefit of Korean Patent Application No. 10-2017-0014110, filed on Jan. 31, 2017, in the Korean Intellectual Property Office, and all the benefits accruing therefrom under 35 U.S.C. § 119, the content of which is incorporated herein in its entirety by reference.

BACKGROUND

1. Field

The present disclosure relates to a lithium secondary battery including an electrolyte containing a monofluorosilane compound.

2. Description of the Related Art

Lithium secondary batteries are used as power sources of portable electronic devices, such as camcorders, mobile phones, and laptop computers. Rechargeable lithium secondary batteries have a high energy density per unit weight which is about three times greater than that of t lead storage batteries, nickel-cadmium (Ni—Cd) batteries, nickel-hydrogen batteries, or nickel-zinc batteries, have good cycle characteristics, and may be charged at high rates.

A lithium-containing metal oxide can be used as a cathode active material in a cathode of a lithium secondary battery. For example, a composite oxide of lithium and a metal selected from cobalt, manganese, nickel (Ni), and a combination thereof may be used as a cathode active material. Ni-rich cathode active materials containing a large amount of Ni can be used to realize a battery having large capacity as compared with a battery including a lithium-cobalt oxide. Thus, studies on Ni-rich cathode active materials are underway.

However, in the case of a Ni-rich cathode active material, a surface structure of the cathode active material may be weak, and thus the cathode active material may have poor lifespan characteristics and increased resistance.

Therefore, there remains a need for a lithium secondary battery which provides improved capacity, improved lifespan characteristics, and low resistance.

SUMMARY

Provided is a lithium secondary battery having an improved structure.

Additional aspects will be set forth in part in the description which follows and, in part, will be apparent from the description, or may be learned by practice of the presented embodiments.

According to an aspect of an embodiment, a lithium secondary battery includes a cathode; an anode; and an electrolyte disposed between the cathode and the anode, wherein the cathode includes a cathode active material represented by Formula 1, the electrolyte includes a lithium salt; a non-aqueous solvent; and a monofluorosilane compound represented by Formula 2, wherein an amount of the monofluorosilane compound is in a range of about 0.1 percent by weight (wt %) to about 5 wt %, based on the total weight of the electrolyte

Formula 1

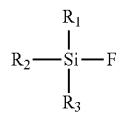

Formula 2 wherein in Formula 1,
$0.95 \leq x \leq 1.2$, $0.85 < y \leq 0.95$, and $0 \leq z < 0.2$;
M is aluminum (Al), magnesium (Mg), manganese (Mn), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), bismuth (Bi), or a combination thereof;
A is an element having an oxidation number of −1 or −2, and in Formula 2,
$R_1$ is a substituted or unsubstituted linear or branched $C_2$-$C_{30}$ alkyl group or a substituted or unsubstituted $C_6$-$C_{60}$ aryl group; and
$R_2$ and $R_3$ are each independently a substituted or unsubstituted linear or branched $C_1$-$C_{30}$ alkyl group or a substituted or unsubstituted $C_6$-$C_{60}$ aryl group,
wherein a substituent of the substituted $C_1$-$C_{30}$ alkyl group or $C_6$-$C_{60}$ aryl group is a halogen, a methyl group, an ethyl group, a propyl group, an iso-propyl group, an n-butyl group, an iso-butyl group, a t-butyl group, a trifluoromethyl group, a tetrafluoroethyl group, a vinyl group, a propenyl group, a butenyl group, or a combination thereof.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section," discussed below could be termed a second element, component, region, layer, or section, without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a lithium secondary battery according to an embodiment will be described in further detail.

According to an embodiment, a lithium secondary battery includes a cathode; an anode; and an electrolyte disposed between the cathode and the anode.

The cathode includes a cathode active material represented by Formula 1.

The electrolyte includes a lithium salt; a non-aqueous solvent; and a monofluorosilane compound represented by Formula 2.

An amount of the monofluorosilane compound can be in a range of about 0.1 percent by weight (wt %) to about 5 wt %, based on the total weight of the electrolyte:

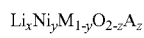

Formula 1

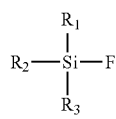

Formula 2

In Formula 1,
$0.95 \leq x \leq 1.2$, $0.85 < y \leq 0.95$, and $0 \leq z < 0.2$;

M is aluminum (Al), magnesium (Mg), manganese (Mn), cobalt (Co), iron (Fe), chromium (Cr), vanadium (V), titanium (Ti), copper (Cu), boron (B), calcium (Ca), zinc (Zn), zirconium (Zr), niobium (Nb), molybdenum (Mo), strontium (Sr), antimony (Sb), tungsten (W), bismuth (Bi), or a combination thereof; and A is an element having an oxidation number of −1 or −2, and in Formula 2, $R_1$ is a substituted or unsubstituted linear or branched $C_2$-$C_{30}$ alkyl group or a substituted or unsubstituted $C_6$-$C_{60}$ aryl group; and $R_2$ and $R_3$ are each independently a substituted or unsubstituted linear or branched $C_1$-$C_{30}$ alkyl group or a substituted or unsubstituted $C_6$-$C_{60}$ aryl group, wherein a substituent of the substituted $C_1$-$C_{30}$ alkyl group or $C_6$-$C_{60}$ aryl group is a halogen, a methyl group, an ethyl group, a propyl group, an iso-propyl group, an n-butyl group, an iso-butyl group, a t-butyl group, a trifluoromethyl group, a tetrafluoroethyl group, a vinyl group, a propenyl group, a butenyl group, or a combination thereof.

While not wanting to be bound by theory, it is understood that when a lithium metal composite oxide having a high Ni content, e.g., the cathode active material represented by Formula 1, is used in a battery, $Ni^{2+}$ cations may elute from a cathode to an electrolyte, and the $Ni^{2+}$ cations may react with a solid electrolyte interface (SEI) film and thus decompose the SEI film. In this regard, some of an anode active material may be exposed to the electrolyte which may cause side reactions. So, despite the advantage of manufacturing a high capacity battery with a high Ni content cathode active material, lifespan characteristics of such battery may deteriorate and a resistance may increase. Therefore, in order to resolve such problem, the lithium secondary battery may use an electrolyte including the monofluorosilane compound represented by Formula 2. The monofluorosilane compound may interact with $Ni^{2+}$ cations eluted in the electrolyte, and thus the $Ni^{2+}$ cations may be stabilized, which may result in decrease of the resistance of the battery. Also, due to addition of the monofluorosilane compound, stability of the SEI film may improve, thereby preventing a capacity and lifespan characteristics of the lithium secondary battery.

Also, in a lithium secondary battery using a Si-based composite as an anode active material, a hydroxyl group on a surface of Si particles is understood to react with cations in an electrolyte during a charge process, and thus an inorganic salt may be formed, which may result in formation of a weak SEI surface. In order to resolve such problem, a predetermined amount of the monofluorosilane compound represented by Formula 2 may be added to the electrolyte. While not wanting to be bound by theory, it is understood that the monofluorosilane compound reacts with a hydroxyl group on a surface of Si particles to capture the hydroxyl group, and thus the hydroxyl group can not form an inorganic salt, and, as a result, a SEI film having improved stability and durability is formed.

Here, an amount of the monofluorosilane compound included in the electrolyte may be in a range of about 0.1 percent by weight (wt %) to about 5 wt %, based on the total weight of the electrolyte, but embodiments are not limited thereto, and the amount may be in any suitable range that stabilizes $Ni^{2+}$ cations eluted to the electrolyte from the cathode active material and allows the monofluorosilane compound to sufficiently react with the hydroxyl group on a surface of Si particles. An amount of the monofluorosilane compound included in the electrolyte may be in a range of about 0.3 wt % to about 4 wt %, about 0.5 wt % to about 3 wt %, or about 0.8 wt % to about 2 wt %, based on the total weight of the electrolyte. When the monofluorosilane compound is within this range, stability and durability of the SEI film of the anode improve, and thus the lithium secondary battery may have improved capacity as well as improved lifespan characteristics and reduced resistance.

In some embodiments, an amount of the monofluorosilane compound may be in a range of about 0.1 wt % to about 4.5 wt %, based on the total weight of the electrolyte. For example, an amount of the monofluorosilane compound may be in a range of about 0.1 wt % to about 4 wt %, based on the total weight of the electrolyte. For example, an amount of the monofluorosilane compound may be in a range of about 0.2 wt % to about 3.5 wt %, based on the total weight of the electrolyte. For example, an amount of the monofluorosilane compound may be in a range of about 0.2 wt % to about 3 wt %, based on the total weight of the electrolyte. For example, an amount of the monofluorosilane compound may be in a range of about 0.3 wt % to about 2.5 wt %, based on the total weight of the electrolyte. For example, an amount of the monofluorosilane compound may be in a range of about 0.3 wt % to about 2 wt %, based on the total weight of the electrolyte. For example, an amount of the monofluorosilane compound may be in a range of about 0.4 wt % to about 2 wt %, based on the total weight of the electrolyte. For example, an amount of the monofluorosilane compound may be in a range of about 0.5 wt % to about 2 wt %, based on the total weight of the electrolyte.

In some embodiments, $R_1$ to $R_3$ of the monofluorosilane compound represented by Formula 2 may be identical to or different from one another. For example, at least one of $R_1$ to $R_3$ may have an alkyl group having a carbon number of 2 or more. For example, at least one of $R_1$ to $R_3$ may be a substituted or unsubstituted $C_6$-$C_{60}$ aryl group. For example, $R_1$ to $R_3$ may be each independently a substituted or unsubstituted linear or branched $C_2$-$C_{30}$ alkyl group.

For example, in Formula 2, $R_1$ may be a substituted or unsubstituted phenyl group, and both $R_2$ and $R_3$ may be a methyl group. For example, in Formula 2, both $R_1$ and $R_3$ may be a substituted or unsubstituted phenyl group, and $R_2$ may be a methyl group. For example, in Formula 2, all of $R_1$ to $R_3$ may be a substituted or unsubstituted phenyl group. For example, in Formula 2, all of $R_1$ to $R_3$ may be a substituted or unsubstituted ethyl group. For example, in Formula 2, all of $R_1$ to $R_3$ may be an isopropyl group.

The monofluorosilane compound may be a compound represented by one of Formulae 2-1 to 2-12, but embodiments are not limited thereto:

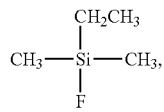

2-1

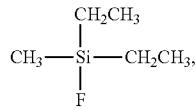

2-2

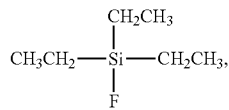

2-3

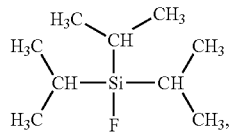

2-4

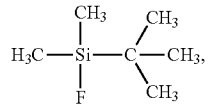

2-5

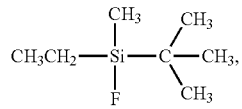

2-6

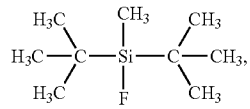

2-7

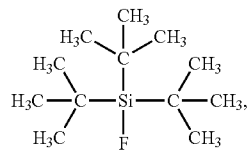

2-8

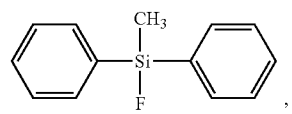

2-9

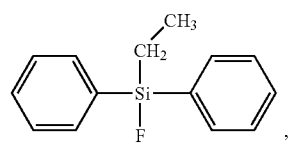

2-10

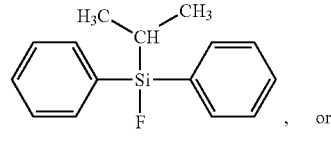

2-11

, or

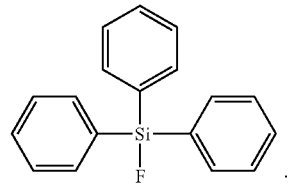

2-12

.

Alternatively, a combination comprising at least one of the foregoing may be used.

The electrolyte may be prepared by dissolving a lithium salt in a non-aqueous solvent. The lithium salt may serve as a source of lithium ions in a battery, enabling operation of the lithium secondary battery.

An anion of the lithium salt in the electrolyte may be $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (where x is a natural number), $(C_xF_{2x+1}SO_2)(C_yF_{2y+1}SO_2)N^-$ (where x and y are each a natural number), a halide, or a combination thereof.

For example, the lithium salt may be lithium difluoro(oxalate)borate (LiDFOB), $LiBF_4$, $LiPF_6$, $LiCF_3SO_3$, $(CF_3SO_2)_2NLi$, $(FSO_2)_2NLi$, or a combination thereof. In some embodiments, the lithium salt may be LiDFOB or $LiPF_6$. The structure of lithium difluoro(oxalate)borate is:

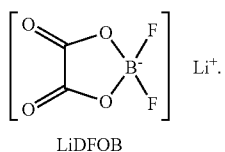

LiDFOB

In some embodiments, the lithium salt may include LiDFOB and LiPF$_6$, and an amount of LiDFOB may be about 2 wt % or less, e.g., about 0.01 wt % to about 2 wt %, or about 0.1 wt % to about 1.5 wt %, based on the total weight of the electrolyte.

The lithium salt in a non-solvent-containing electrolyte may be included by an amount in a range of about 0.001 wt % to about 30 wt %, about 0.01 wt % to about 20 wt %, or about 0.1 wt % to about 10 wt %, based on the total weight of the non-solvent-containing electrolyte, but embodiments are not limited to this range. The lithium salt in a non-solvent-containing electrolyte may be used by an amount that may enable the electrolyte to effectively transfer lithium ions and/or electrons in a charge/discharge process.

A concentration of the lithium salt in a solvent-containing electrolyte may be in a range of about 100 millimoles per liter (mM) to about 10 moles per liter (M). For example, the concentration may be in a range of about 100 mM to about 2 M. For example, the concentration may be in a range of about 500 mM to about 2 M. When the concentration is lower than 100 mM, ion conductivity of the electrolyte may be low, which may result in deterioration of electrolyte performance. Also, when the concentration is higher than 2 M, viscosity of the electrolyte increases, which may result in a decrease in mobility of lithium ions.

The non-aqueous solvent included in the electrolyte may serve as a medium that allows ions to move during a charge/discharge process of the lithium secondary battery. The non-aqueous solvent may comprise a carbonate-based solvent, an ester-based solvent, an ether-based solvent, a ketone-based solvent, an aprotic solvent, or a combination thereof. Examples of the carbonate-based solvent include dimethyl carbonate (DMC), diethyl carbonate (DEC), ethylmethyl carbonate (EMC), dipropyl carbonate (DPC), methylpropyl carbonate (MPC), ethylpropyl carbonate (EPC), ethylene carbonate (EC), propylene carbonate (PC), butylene carbonate (BC), and tetraethylene glycol dimethyl ether (TEGDME). Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyl tetrahydrofuran, and tetrahydrofuran. An example of the ketone-based solvent may be cyclohexanone. Examples of the aprotic solvent include nitriles such as compounds of the formula R—CN, wherein R is a C$_2$-C$_{20}$ linear, branched, or cyclic hydrocarbon, a double bond, an aromatic ring, or an ether bond, amides such as dimethyl formamide (DMF), dioxolanes such as 1,3-dioxolane, or sulfolanes. A combination comprising at least one of the foregoing may be used.

The non-aqueous solvent may be used alone or in a combination comprising at least one of the non-aqueous solvents. When the combination of at least one of the non-aqueous solvent is used, a mixing ratio thereof may be appropriately adjusted according to performance of a battery, which may be understood by one of ordinary skill in the art.

When the carbonate-based solvent is used, a mixture of linear carbonate and cyclic carbonate may be used. In this case, performance of the electrolyte may be improved when the linear carbonate and the cyclic carbonate are mixed at a volume ratio of about 1:1 to about 9:1.

In some embodiments, in order to form a stable SEI film on a surface of an anode in a charge/discharge process of the lithium secondary battery, a fluoro-ethylene carbonate (FEC), vinylene carbonate (VC), vinylethylene carbonate (VEC), a phosphine compound, a phosphite compound, a phosphate compound, a sulfonate compound, a disulfonate compound, or a combination thereof may further be included in the non-aqueous solvent.

For example, the non-aqueous solvent may include fluoro-ethylene carbonate (FEC). For example, the lithium secondary battery may include FEC in an amount in a range of about 20 wt % or less, based on the total weight of the non-aqueous solvent. For example, the lithium secondary battery may include FEC in an amount in a range of about 0.3 wt % to about 20 wt %, based on the total weight of the non-aqueous solvent. For example, the lithium secondary battery may include FEC in an amount in a range of about 1 wt % to about 20 wt %, based on the total weight of the non-aqueous solvent. For example, the lithium secondary battery may include FEC in an amount in a range of about 2 wt % to about 20 wt %, based on the total weight of the non-aqueous solvent. When FEC is included in the non-aqueous solvent in an amount with these ranges, an effective SEI film that lithium ions may be rapidly formed. Also, when the non-aqueous solvent further includes monofluorosilane in addition to FEC, not only the effective SEI film may be rapidly formed on a surface of the anode, but a coating layer including monofluorosilane may also be formed on the SEI film. In this regard, durability of the SEI film may improve, and decrease in capacity due to the loss of the anode active material (e.g., Si) may be prevented.

For example, the electrolyte may further include VC, VEC, maleic anhydride, succinic anhydride, or a mixture thereof. In some embodiments, the lithium secondary battery may further include VC, VEC, maleic anhydride, succinic anhydride, or a mixture thereof by an amount in a range of about 0.1 wt % to about 3 wt %, based on the total weight of the electrolyte. For example, the lithium secondary battery may further include VC, VEC, maleic anhydride, succinic anhydride, or a combination thereof in an amount in a range of about 0.1 wt % to about 2 wt %, based on the total volume of the electrolyte. For example, the lithium secondary battery may further include VC, VEC, maleic anhydride, succinic anhydride, or a combination thereof in an amount in a range of about 0.1 wt % to about 1 wt %, based on the total weight of the electrolyte.

In an embodiment, the electrolyte may further include maleic anhydride, but embodiments are not limited thereto. For example, the lithium secondary battery may further include maleic anhydride in an amount in a range of about 0.1 wt % to about 1.5 wt %, based on the total weight of the electrolyte. For example, the lithium secondary battery may further include maleic anhydride in an amount in a range of about 0.2 wt % to about 1.5 wt %, based on the total weight of the electrolyte. For example, the lithium secondary battery may further include maleic anhydride in an amount in a range of about 0.3 wt % to about 1.5 wt %, based on the total weight of the electrolyte.

For example, the electrolyte may include a phosphine compound, a phosphite compound, a phosphate compound, or a combination thereof in an amount in a range of about 0.1 wt % to about 3 wt %, based on the total weight of the electrolyte. For example, the electrolyte may include a phosphine compound, a phosphite compound, a phosphate compound, or a combination thereof in an amount in a range of about 0.1 wt % to about 2 wt %, based on the total weight of the electrolyte. For example, the electrolyte may include a phosphine compound, a phosphite compound, a phosphate compound, or a combination thereof in an amount in a range of about 0.1 wt % to about 1 wt %, based on the total weight of the electrolyte.

The phosphine compound may be, for example, triphenylphosphine, tris(4-fluorophenyl) phosphine, tris(2,4-difluorophenyl)phosphine, or tris(perfluorophenyl)phosphine, but embodiments of the phosphine compound are not limited thereto. The phosphate compound may be, for example, trimethyl phosphate, triethyl phosphate, tripropyl phosphate, or tributyl phosphate, but embodiments of the phosphate compound are not limited thereto. The phosphite compound may be, for example, triethyl phosphite, trimethyl phosphite, tripropyl phosphite, tributyl phosphite, or tris(trimethylsilyl) phosphite, but embodiments are not limited thereto. A combination comprising at least one of the foregoing may be used.

For example, the electrolyte may further include a sulfone compound, a sulfonate compound, a disulfonate compound, or a combination thereof in an amount in a range of about 0.1 wt % to about 3 wt %, based on the total weight of the electrolyte. For example, the electrolyte may further include a sulfone compound, a sulfonate compound, a disulfonate compound, or a combination thereof in an amount in a range of about 0.3 wt % to about 2 wt %, based on the total weight of the electrolyte. For example, the electrolyte may further include a sulfone compound, a sulfonate compound, a disulfonate compound, or a combination thereof in an amount in a range of about 0.5 wt % to about 1 wt %, based on the total weight of the electrolyte.

Examples of the sulfone compound may include ethylmethyl sulfone, divinyl sulfone, or tetramethylene sulfone, but embodiments are not limited thereto. Examples of the sulfonate compound may include methyl methane sulfonate, ethyl methane sulfonate, or diallyl sulfonate, but embodiments are not limited thereto. Examples of the disulfonate compound may include methylmethylenedisulfonate, but embodiments are not limited thereto. A combination comprising at least one of the foregoing may be used.

Hereinafter, the configuration of the lithium secondary battery will be described in further detail.

The cathode may include the cathode active material represented by Formula 1, and, for example, A in Formula 1 may be selected from halogen, S, and N, but embodiments are not limited thereto.

In some embodiments, in Formula 1, $0.88 \leq y \leq 0.95$.

In some embodiments, the cathode active material may be represented by Formula 3 or 4:

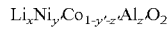

Formula 3

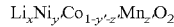

Formula 4

In Formulae 3 and 4, $0.9 \leq x \leq 1.2$, $0.85 < y' \leq 0.95$, $0 < z' < 0.1$, and $0 < 1-y'-z' < 0.15$.

For example, the cathode may include $Li_{1.02}Ni_{0.86}Co_{0.08}Mn_{0.04}O_2$, $Li_{1.02}Ni_{0.86}Co_{0.08}Al_{0.04}O_2$, $Li_{1.02}Ni_{0.88}Co_{0.08}Mn_{0.04}O_2$, $Li_{1.02}Ni_{0.88}Co_{0.88}Al_{0.04}O_2$, $Li_{1.02}Ni_{0.95}Co_{0.08}Mn_{0.04}O_2$, $Li_{1.02}Ni_{0.95}Co_{0.08}Al_{0.04}O_2$, or a combination thereof as a cathode active material.

Also, the cathode may further include lithium cobalt oxide, lithium nickel cobalt manganese oxide, lithium nickel cobalt aluminum oxide, lithium iron phosphate, lithium manganese oxide, or a combination thereof, in addition to the aforementioned cathode active materials, but embodiments of the cathode active materials are not limited thereto. Any suitable cathode active material available in the art may further be included in the cathode.

In some embodiments, the cathode active material may be a compound represented by the following formulae: $Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq 0.5 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from oxygen (O), fluorine (F), sulfur (S), phosphorus (P), and combinations thereof; E may be selected from cobalt (Co), manganese (Mn), and combinations thereof; F may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

A cathode is prepared in the following manner.

The cathode may be prepared by applying, drying, and pressing a cathode active material on a cathode current collector. In addition to the above-described cathode active materials, a cathode active material composition in which a binder and a solvent are mixed may be prepared, if necessary.

The cathode active material composition may further include a conducting agent or a filler.

In some embodiments, the cathode active material composition may be directly coated on a metallic current collector to prepare a cathode plate. In some embodiments, the cathode active material composition may be cast on a separate support to form a cathode active material film, which may then be separated from the support and laminated on a metallic current collector to prepare a cathode plate.

In some embodiments, a loading level of the prepared cathode active material composition may be about 30 milligrams per square centimeter ($mg/cm^2$) or greater, or, in particular, about 35 $mg/cm^2$ or greater, or in particular, about 40 mg/cm² or greater. In addition, an electrode density thereof may be about 3 grams per cubic centimeter (g/cc) or greater, or, in particular, about 3.5 g/cc or greater.

In an embodiment, in order to achieve a high cell energy density, a loading level of the prepared cathode active material composition may be in a range of about 35 mg/cm² or greater to about 50 mg/cm² or less, and an electrode density thereof may be in a range of about 3.5 g/cc or greater to about 4.2 g/cc or less.

In another embodiment, both surfaces of the cathode electrode plate may be coated with the cathode active material composition at a loading level of about 37 mg/cm² and at an electrode density of about 3.6 g/cc.

When a loading level and an electrode density of the cathode active material composition are within these ranges, a battery including the cathode active material may have a high cell energy density of about 500 watt-hours per liter (Wh/L) or greater. For example, the battery may have a cell energy density in a range of about 500 Wh/L to about 900 Wh/L.

Examples of the solvent are N-methyl-pyrrolidone, acetone, and water, but embodiments are not limited thereto. An amount of the solvent may be in a range of about 10 parts to about 100 parts by weight based on 100 parts by weight of the cathode active material. When the amount of the solvent is within this range, a process for forming the cathode active material layer may be performed efficiently.

An amount of the conducting agent may generally be in a range of about 1 wt % to about 30 wt % based on the total weight of a mixture including a cathode active material. The conducting agent may be any suitable material having suitable electrical conductivity that does not cause an undesirable chemical change in a battery. Examples of the conducting agent include graphite, such as natural graphite or artificial graphite; a carbonaceous material, such as carbon black, acetylene black, Ketjen black, channel black, furnace black, lamp black, or summer black; conductive fibers, such as carbon fibers or metal fibers; a metal powder of fluorinated carbon, aluminum, or nickel; a conductive whisker, such as zinc oxide or potassium titanate; a conductive metal oxide, such as titanium oxide; and a conductive material, such as a polyphenylene derivative.

The binder is a component which may assist in bonding of an active material to a conducting agent and to a current collector, and may generally be added by an amount of about 1 wt % to about 30 wt %, based on the total weight of a mixture including a cathode active material. Examples of the binder may include polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinyl pyrrolidone, tetrafluoro ethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyether sulfone, polyamide, polyacetal, polyphenylene oxide, polybutylene terephthalate, an ethylene-propylene-diene monomer (EPDM), a sulfonated EPDM, a styrene-butadiene rubber, a fluorine rubber, and various suitable copolymers, but embodiments are not limited thereto. The filler may optionally be included as a component for suppressing expansion of a cathode. The filler may not be particularly limited, and may be any suitable fibrous material that does not cause an undesirable chemical change in a battery. For example, a fibrous material, such as an olefin-based polymer, e.g., polyethylene or polypropylene; glass fibers; or carbon fibers, may be used as filler.

Amounts of the cathode active material, the conducting agent, the filler, the binder, and the solvent may be in ranges that are commonly used in lithium batteries. At least one of the conducting agent, the filler, the binder, and the solvent may be omitted according to the use and the structure of the lithium battery.

In some embodiments, N-methylpyrrolidone (NMP) may be used as a solvent, PVdF or PVdF copolymer may be used as a binder, and carbon black or acetylene black may be used as a conducting agent. For example, 94 wt % of a cathode active material, 3 wt % of a binder, and 3 wt % of a conducting agent may be mixed in a powder form, and then NMP may be added thereto such that a slurry is formed with a solid content of 70 wt %. This slurry may then be coated, dried, and roll-pressed to prepare a cathode electrode plate.

The cathode current collector may be, in general, prepared to have a thickness in a range of about 3 micrometers (μm) to about 50 μm. The cathode current collector is not particularly limited, and may be any suitable material as long as the cathode current collector has suitable electrical conductivity and does not cause an undesirable chemical change in a battery. Examples of the cathode current collector include stainless steel, aluminum, nickel, titanium, and sintered carbon; and aluminum or stainless steel, the aluminum and the stainless steel each being surface-treated with carbon, nickel, titanium, or silver. The cathode current collector may be processed to have fine bumps on surfaces thereof so as to enhance a binding force of the cathode active material to the current collector. The cathode current collector may be used in any of various suitable forms such as a film, a sheet, a foil, a net, a porous body, foam, and a non-woven fabric.

In the lithium secondary battery, the anode may include an anode active material including a metal alloyable with lithium and/or a carbonaceous anode active material.

In some embodiments, the anode active material including a metal alloyable with lithium may include at least one selected from silicon (Si), a silicon-carbon composite material including Si particles, and $SiO_{a'}$ (wherein $0<a'<2$).

In some embodiments, the Si particles in the silicon-carbon composite material may have an average diameter of 200 nanometers (nm) or less.

Examples of the anode active material include, in addition to the aforementioned anode active materials, Sn, Al, Ge, Pb, Bi, Sb, a Si—Y' alloy (wherein Y' may be an alkali metal, an alkaline earth-metal, a Group XIII element, a Group XIV element, a transition metal, a rare-earth element, or a combination thereof, and Y' may not be Si), and a Sn—Y' alloy (wherein Y' may be an alkali metal, an alkaline earth-metal, a Group XIII element, a Group XIV element, a transition metal, a rare-earth element, or a combination thereof, and Y may not be Sn). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

An anode may be prepared in the following manner.

The anode may be prepared by applying, drying, and pressing an anode active material on an anode current collector. In addition to the above-described anode active materials, an anode active material composition in which a binder and a solvent are mixed may be prepared, if necessary.

The anode active material composition may further include a conducting agent or a filler.

In an embodiment, the binder, the solvent, the conducting agent, and the filler used for the cathode material composition may also be used for the anode active material composition.

Water may also be used as a solvent in the anode active material composition. In some embodiments, water may be used as a solvent; CMC, SBR, acrylate, or a methacrylate-based polymer may be used as a binder; and carbon black or acetylene black may be used as a conducting agent. For example, 94 wt % of an anode active material, 3 wt % of a binder, and 3 wt % of a conducting agent may be mixed in a powder form, and then water may be added thereto such that a slurry is formed with a solid content of 70 wt %. This slurry may be then coated, dried, and roll-pressed to prepare an anode plate.

A loading level of the prepared anode active material composition may be determined depending on a loading level of the cathode active material composition.

In some embodiments, a loading level of the anode active material composition may be, depending on capacity per gram, about 12 mg/cm$^2$ or greater, and in some embodiments, about 15 mg/cm$^2$ or greater. An electrode density thereof may be about 1.5 g/cc or greater, and in some embodiments, about 1.6 g/cc or greater.

When a loading level and an electrode density of the anode active material composition are within any of these ranges, a battery including the anode active material may have a high cell energy density of about 500 Wh/L or greater.

The anode current collector may be, in general, prepared to have a thickness in a range of about 3 μm to about 50 μm. The anode current collector is not particularly limited, and may be any suitable material as long as the anode current collector has suitable electrical conductivity and does not cause an undesirable chemical change in a battery. Examples of the anode current collector may include copper, stainless steel, aluminum, nickel, titanium, and sintered carbon; copper or stainless steel, the copper and the stainless steel each being surface-treated with carbon, nickel, titanium, or silver; and an aluminum-cadmium alloy. In addition, like the cathode current collector, the anode current collector may be processed to have fine bumps on surfaces of the anode current collector to enhance a binding force of the anode active material to the current collector. The anode current collector may be used in any of various suitable forms such as a film, a sheet, a foil, a net, a porous body, foam, and a non-woven fabric.

In an embodiment, the lithium secondary battery may exhibit a direct current internal resistance (DCIR) increase rate of less than about 140% after 200 charge/discharge cycles at a temperature of about 45° C. under a charge/discharge current of 1 C/1 C, an operating voltage in a range of about 2.8 volts (V) to about 4.3 V, and a cut-off current of ⅒ C in a constant current-constant voltage (CC-CV) mode.

That is, as compared with conventional Ni-rich lithium secondary batteries, the lithium secondary battery may have a significantly low DCIR increase rate. Accordingly, the lithium secondary battery may exhibit excellent battery characteristics.

For example, an operating voltage of the lithium secondary battery may be in a range of about 2.8 V to about 4.3 V.

For example, an energy density of the lithium secondary battery may be about 500 Wh/L or greater.

In an embodiment, the lithium secondary battery may further include a separator between the cathode and the anode. The separator may be an insulating thin film having excellent ion permeability and mechanical strength. The separator may have a pore diameter in a range of about 0.001 μm to about 1 μm in general, and a thickness thereof may be in a range of about 3 μm to about 30 μm in general. Examples of the separator may include a chemically resistant and hydrophobic olefin-based polymer, e.g., polypropylene; and a sheet or non-woven fabric formed of glass fiber or polyethylene. When a solid electrolyte such as a polymer is used as an electrolyte, the solid electrolyte may also serve as a separator.

The electrolyte may further include, in addition to the aforementioned electrolyte, a solid electrolyte and an inorganic solid electrolyte.

Examples of the organic solid electrolyte may include a polyethylene derivative, a polyethylene oxide derivative, a polypropylene oxide derivative, a phosphoric acid ester polymer, a polyester sulfide, a polyvinyl alcohol, PVdF, and a polymer including a dissociable ionic group.

Examples of the inorganic solid electrolyte may include a nitride, a halide, and a sulfate of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium secondary battery may be prepared by a general method known in the art, that is, the lithium secondary battery may be prepared by injecting an electrolyte between a cathode and an anode.

The aforementioned cathode, anode, and separator may be wound or folded, and then sealed in a battery case. Then, the battery case may be filled with an electrolyte and then sealed by a cap assembly member, to thereby complete the preparation of a lithium secondary battery. The battery case may be a cylindrical type, a rectangular type, or a thin-film type.

The lithium secondary battery may be classified as a winding type or a stack type depending on a structure of electrodes, or as a cylindrical type, a rectangular type, a coin type, or a pouch type, depending on an exterior shape thereof.

Methods of manufacturing a lithium secondary battery are widely known in the art and thus a detailed description thereof is omitted.

According to another aspect, a battery module may include the lithium secondary battery as a unit cell.

According to another aspect, a battery pack may include the battery module.

According to another aspect, a device may include the battery pack. Examples of the device may include power tools powered by an electric motor; electric cars, e.g., electric vehicles (EVs), hybrid electric vehicles (HEVs), plug-in hybrid electric vehicles (PHEVs); electric two-wheeled vehicles, e.g., e-bikes and e-scooters; electric golf carts; and power storage systems, but embodiments are not limited thereto.

Further, the lithium secondary battery may be used in any applications that require high-power output, high-voltage, and operation under high-temperature conditions.

Hereinafter example embodiments will be described in detail with reference to Examples and Comparative Examples. These examples are provided for illustrative purposes only and are not intended to limit the scope of the inventive concept.

EXAMPLES

Example 1

(Preparation of Cathode)

$Li_{1.02}Ni_{0.88}Co_{0.08}Mn_{0.04}O_2$ as a cathode active material, carbon black as a conducting agent, and PVdF as a binder were mixed at a weight ratio of 94:3:3 in NMP, and the mixture was dispersed at a loading level of 37 mg/cm$^2$ to coat both surfaces of an aluminum foil having a thickness of 12 μm, dried, and then roll-pressed to prepare a cathode having an electrode density of 3.6 g/cc.

(Preparation of Anode)

98 wt % of graphite (available from Mitsubishi), 1.0 wt % of SBR as a binder, and 1.0 wt % of carboxymethylcellulose were mixed and added to distilled water. The mixture was stirred for 60 minutes by using a mechanical stirrer to prepare an anode active material slurry. The slurry was dispersed at a loading level of 18.42 mg/cm$^2$ to a copper foil having a thickness of 10 μm, dried, and then roll-pressed to prepare an anode having an electrode density of 1.65 g/cc.

(Preparation of Electrolyte)

1 volume percent (vol %) of VC based on the total volume of the electrolyte was added to a mixture including 1.15 M of $LiPF_6$ and EC, FEC, EMC, and DMC (at a volume ratio of 7:7:46:40), and 1 wt % of diphenylmethylfluorosilane based on the total weight of the electrolyte was added thereto, and thus an electrolyte was prepared.

(Preparation of Lithium Secondary Battery)

A separator having a thickness of 16 μm formed of polypropylene was disposed between the cathode and the anode, and the electrolyte was injected thereto, thereby preparing a lithium secondary battery.

Example 2

A lithium secondary battery was prepared in the same manner as in Example 1, except that an electrolyte was prepared by adding 1 wt % of trimethylphosphate based on the total weight of the electrolyte.

Example 3

A lithium secondary battery was prepared in the same manner as in Example 1, except that an electrolyte was prepared by adding 0.3 wt % of maleic anhydride and 1 wt % of trimethylphosphate based on the total weight of the electrolyte.

Example 4

A lithium secondary battery was prepared in the same manner as in Example 1, except that an electrolyte was prepared by adding 0.5 wt % of methylmethylenedisulfonate based on the total weight of the electrolyte.

Example 5

A lithium secondary battery was prepared in the same manner as in Example 1, except that $Li_{1.02}Ni_{0.86}Co_{0.08}Mn_{0.04}O_2$ was used as a cathode active material instead of $Li_{1.02}Ni_{0.88}Co_{0.8}Mn_{0.04}O_2$.

Example 6

A lithium secondary battery was prepared in the same manner as in Example 1, except that $Li_{1.02}Ni_{0.86}Co_{0.08}Mn_{0.04}O_2$ was used as a cathode active material instead of $Li_{1.02}Ni_{0.88}Co_{0.8}Mn_{0.04}O_2$.

Comparative Example 1

A lithium secondary battery was prepared in the same manner as in Example 1, except that $Li_{1.02}Ni_{0.84}Co_{0.08}Mn_{0.04}O_2$ was used as a cathode active material instead of $Li_{1.02}Ni_{0.88}Co_{0.8}Mn_{0.04}O_2$.

Comparative Example 2

A lithium secondary battery was prepared in the same manner as in Example 1, except that $Li_{1.02}Ni_{0.96}Co_{0.08}Mn_{0.04}O_2$ was used as a cathode active material instead of $Li_{1.02}Ni_{0.88}Co_{0.8}Mn_{0.04}O_2$.

Comparative Example 3

A lithium secondary battery was prepared in the same manner as in Example 1, except that an electrolyte was prepared without diphenylmethylfluorosilane.

Comparative Example 4

A lithium secondary battery was prepared in the same manner as in Example 1, except that an electrolyte was prepared by adding 1 vol % of VC based on the total volume of the electrolyte to a mixture including 1.15 M of $LiPF_6$ and EC, EMC, and DMC (at a volume ratio of 2:4:4) and adding 1 wt % of hexamethylcyclosiloxane based on the total weight of the electrolyte.

Example 7

(Preparation of Cathode)

$Li_{1.02}Ni_{0.88}Co_{0.08}Al_{0.04}O_2$ as a cathode active material, carbon black as a conducting agent, and PVdF as a binder were mixed at a weight ratio of 94:3:3 in NMP, and the mixture was dispersed at a loading level of 37 mg/cm$^2$ to coat both surfaces of an aluminum foil having a thickness of 12 μm, dried, and then roll-pressed to prepare a cathode having an electrode density of 3.6 g/cc.

(Preparation of Anode)

A Si—C composite (SCN1, available from BTR), graphite, CMC, and SBR were mixed together at a weight ratio of 25:73:1.5:0.5. Then, the mixture was mixed with NMP to prepare slurry. The slurry was dispersed at a loading level of 18.42 mg/cm$^2$ to coat a copper foil having a thickness of 10 μm, dried, and then roll-pressed to prepare an anode having an electrode density of 1.65 g/cc.

(Preparation of Electrolyte)

An electrolyte was prepared by adding 1 vol % of VC based on the total volume of the electrolyte to a mixture including 1.15 M of $LiPF_6$ and EC, FEC, EMC, and DMC (at a volume ratio of 7:7:46:40) and further adding 1 wt % of triethylfluorosilane and 1 wt % of LiDFOB based on the total weight of the electrolyte thereto.

(Preparation of Lithium Secondary Battery)

A separator having a thickness of 16 μm formed of polypropylene was disposed between the cathode and the anode, and the electrolyte was injected thereto, thereby preparing a lithium secondary battery.

Example 8

A lithium secondary battery was prepared in the same manner as in Example 7, except that an electrolyte was prepared by adding 1 wt % of diphenylmethylfluorosilane based on the total weight of the electrolyte, instead of triethylfluorosilane.

Example 9

A lithium secondary battery was prepared in the same manner as in Example 7, except that an electrolyte was prepared by adding 1 wt % of triisopropylfluorosilane based on the total weight of the electrolyte, instead of triethylfluorosilane.

Example 10

A lithium secondary battery was prepared in the same manner as in Example 7, except that an electrolyte was prepared without LiDFOB and by adding 1 wt % of diphenylmethylfluorosilane based on the total weight of the electrolyte, instead of triethylfluorosilane; adding 0.3 wt % of maleic anhydride based on the total weight of the electrolyte; and adding 1 wt % of trimethylphosphate and 0.4 wt % of methylmethylenedisulfonate based on the total weight of the electrolyte.

Example 11

A lithium secondary battery was prepared in the same manner as in Example 7, except that $Li_{1.02}Ni_{0.86}Co_{0.08}Al_{0.04}O_2$ was used as a cathode active material instead of $Li_{1.02}Ni_{0.88}Co_{0.08}Al_{0.04}O_2$.

Example 12

A lithium secondary battery was prepared in the same manner as in Example 7, except that $Li_{1.02}Ni_{0.95}Co_{0.08}Mn_{0.04}O_2$ was used as a cathode active material instead of $Li_{1.02}Ni_{0.88}Co_{0.8}Mn_{0.04}O_2$.

Comparative Example 5

A lithium secondary battery was prepared in the same manner as in Example 7, except that $Li_{1.02}Ni_{0.84}Co_{0.08}Al_{0.04}O_2$ was used as a cathode active material instead of $Li_{1.02}Ni_{0.88}Co_{0.08}Al_{0.04}O_2$.

Comparative Example 6

A lithium secondary battery was prepared in the same manner as in Example 7, except that $Li_{1.02}Ni_{0.96}Co_{0.08}Al_{0.04}O_2$ was used as a cathode active material instead of $Li_{1.02}Ni_{0.88}Co_{0.08}Al_{0.04}O_2$.

Comparative Example 7

A lithium secondary battery was prepared in the same manner as in Example 7, except that an electrolyte was prepared without triethylfluorosilane and LiDFOB.

Comparative Example 8

A lithium secondary battery was prepared in the same manner as in Example 7, except that an electrolyte was prepared without triethylfluorosilane and by adding 1 wt % of hexamethylcyclosiloxane based on the total weight of the electrolyte, instead of LiDFOB.

Evaluation Example 1: Evaluation of Lifespan and Resistance

The lithium secondary batteries prepared in Examples 1 to 12 and Comparative Examples 1 to 8 were subject to 200 charge/discharge cycles at a temperature of 45° C., under a charge/discharge current of 1 C/1 C, an operating voltage in a range of about 2.8 V to about 4.3 V, and a cut-off current of 1/10 C in a CC-CV mode. Then, a DCIR increase rate and a capacity retention rate of the lithium secondary batteries were evaluated. The results of the evaluation are shown in Table 1. Capacity retention at $200^{th}$ cycles may be defined using Equation 1 below.

Capacity retention=[Discharge capacity at $200^{th}$ cycle/Discharge capacity at $1^{st}$ cycle]×100%  Equation 1

TABLE 1

|  | Capacity retention (%) | DCIR increase (%) |
|---|---|---|
| Example 1 | 83.2 | 133 |
| Example 2 | 85.2 | 128 |
| Example 3 | 84.9 | 118 |
| Example 4 | 84.2 | 113 |
| Example 5 | 84.6 | 130 |
| Example 6 | 80.2 | 139 |
| Example 7 | 81.1 | 126 |
| Example 8 | 81.1 | 125 |
| Example 9 | 80.3 | 138 |
| Example 10 | 83.3 | 112 |
| Example 11 | 85.2 | 128 |
| Example 12 | 79.5 | 138 |
| Comparative Example 1 | 82.3 | 156 |
| Comparative Example 2 | 71.2 | 178 |
| Comparative Example 3 | 81.6 | 158 |
| Comparative Example 4 | 79.2 | 154 |
| Comparative Example 5 | 81.2 | 162 |
| Comparative Example 6 | 67.1 | 182 |
| Comparative Example 7 | 79.6 | 145 |
| Comparative Example 8 | 76.1 | 158 |

Referring to Table 1, the lithium secondary batteries of Examples 1 to 8 were found to have increased capacity retention rates and significantly decreased DCIR increase rates, compared to those of the lithium secondary batteries of Comparative Examples 1 to 8 including no monofluorosilane compound under the same conditions. Also, in the case of the lithium secondary battery of Comparative Example 1 including a monofluorosilane compound, the DCIR increase rate was found to be increased. This proves that the monofluorosilane compound effectively functions when a Ni-rich lithium metal composite oxide is used. In the case of the lithium secondary battery of Comparative Example 2, the capacity retention rate did not decrease, but the DCIR increase rate was found to be significantly increased.

Also, referring to Table 1, when the lithium secondary batteries of Examples 7 to 12 and Comparative Examples 3 and 4 are compared, the DCIR increase rates of the lithium secondary batteries using the Si—C composite as an anode active material were found to be significantly decreased.

As a result, the lithium secondary batteries of Examples 1 to 12 were found to have decreased DCIR increase rates at the same time exhibiting excellent lifespan characteristics (i.e., having high capacity retention rates).

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium secondary battery comprising:
   a cathode;
   an anode, wherein the anode comprises a silicon-carbon composite material comprising Si particles; and
   an electrolyte disposed between the cathode and the anode,
   wherein the cathode comprises a cathode active material represented by Formula 4,
   the electrolyte comprises a lithium salt; a non-aqueous solvent; and a monofluorosilane compound represented by Formula 2,
   wherein an amount of the monofluorosilane compound is in a range of about 0.1 percent by weight to about 5 weight percent, based on a total weight of the electrolyte

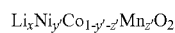
Formula 4

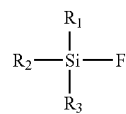
Formula 2 wherein, in Formula 4, 0.9≤x≤1.2, 0.85<y'≤0.95, 0<z'<0.1, and 0<1-y'-z'<0.15, in Formula 2,
$R_1$ is a substituted or unsubstituted linear or branched $C_2$-$C_{30}$ alkyl group or a substituted or unsubstituted $C_6$-$C_{60}$ aryl group; and
$R_2$ and $R_3$ are each independently a substituted or unsubstituted linear or branched $C_1$-$C_{30}$ alkyl group or a substituted or unsubstituted $C_6$-$C_{60}$ aryl group,
wherein a substituent of the substituted $C_1$-$C_{30}$ alkyl group or $C_6$-$C_{60}$ aryl group is a halogen, a methyl group, an ethyl group, a propyl group, an iso-propyl group, an n-butyl group, an iso-butyl group, a t-butyl group, a trifluoromethyl group, a tetrafluoroethyl group, a vinyl group, a propenyl group, a butenyl group, or a combination thereof.

2. The lithium secondary battery of claim 1, wherein an amount of the monofluorosilane compound is in a range of about 0.5 percent by weight to about 2 percent by weight, based on the total weight of the electrolyte.

3. The lithium secondary battery of claim 1, wherein at least one of $R_1$ to $R_3$ is a substituted or unsubstituted $C_6$-$C_{60}$ aryl group.

4. The lithium secondary battery of claim 1, wherein $R_1$ to $R_3$ are each independently a substituted or unsubstituted linear or branched $C_2$-$C_{30}$ alkyl group.

5. The lithium secondary battery of claim 1, wherein the monofluorosilane compound is a compound represented by one of Formulae 2-1 to 2-12:

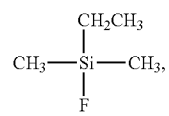
2-1

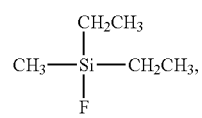
2-2

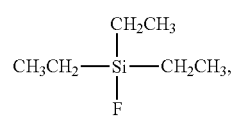
2-3

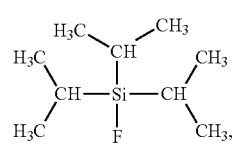
2-4

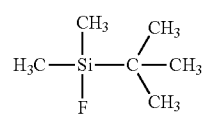
2-5

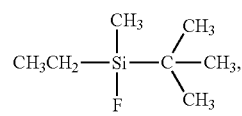
2-6

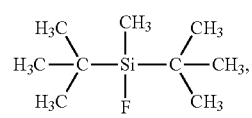
2-7

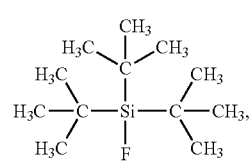
2-8

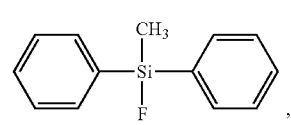
2-9

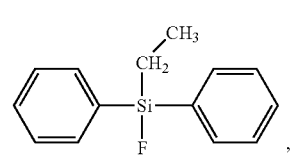
2-10

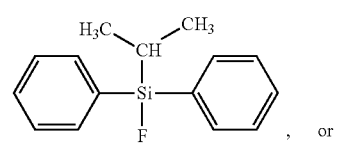
2-11

, or

-continued

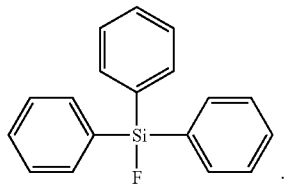

2-12

6. The lithium secondary battery of claim 1, wherein the lithium salt is lithium difluoro(oxalate)borate, $LiBF_4$, $LiPF_6$, $LiCF_3SO_3$, $(CF_3SO_2)_2NLi$, $(FSO_2)_2NLi$, or a combination thereof.

7. The lithium secondary battery of claim 6,
wherein the lithium salt comprises $LiPF_6$ and lithium difluoro(oxalate)borate, and
wherein an amount of the lithium difluoro(oxalate)borate is about 2 percent by weight or less, based on the total weight of the electrolyte.

8. The lithium secondary battery of claim 1, wherein the non-aqueous solvent comprises fluoroethylene carbonate.

9. The lithium secondary battery of claim 8, wherein an amount of the fluoroethylene carbonate is in a range of about 0.3 percent by weight to about 20 percent by weight, based on a total weight of the non-aqueous solvent.

10. The lithium secondary battery of claim 1,
wherein the electrolyte further comprises vinylene carbonate, vinyl ethylene carbonate, maleic anhydride, succinic anhydride, or a combination thereof in an amount in a range of about 0.1 percent by weight to about 3 percent by weight, based on the total weight of the electrolyte.

11. The lithium secondary battery of claim 10, wherein the electrolyte further comprises the maleic anhydride in an amount in a range of about 0.1 percent by weight to about 1.5 percent by weight, based on the total weight of the electrolyte.

12. The lithium secondary battery of claim 1, wherein the electrolyte further comprises a phosphine compound, a phosphite compound, a phosphate compound, or a mixture thereof by an amount in a range of about 0.1 percent by weight to about 3 percent by weight, based on the total weight of the electrolyte.

13. The lithium secondary battery of claim 1, wherein the electrolyte further comprises a sulfone compound, a sulfonate compound, a disulfonate compound, or a combination thereof in an amount in a range of about 0.1 percent by weight to about 3 percent by weight, based on the total weight of the electrolyte.

14. The lithium secondary battery of claim 1, wherein in Formula 4, y is $0.88<y'\leq0.95$.

15. The lithium secondary battery of claim 1, wherein the cathode active material comprises $Li_{1.02}Ni_{0.86}Co_{0.08}Mn_{0.04}O_2$, $Li_{1.02}Ni_{0.88}Co_{0.08}Mn_{0.04}O_2$, or $Li_{1.02}Ni_{0.95}Co_{0.08}Mn_{0.04}O_2$.

16. The lithium secondary battery of claim 1, wherein a direct current internal resistance increase after 200 cycles of charging/discharging at a temperature of about 45° C. is less than about 140 percent.

17. The lithium secondary battery of claim 1, wherein a cell energy density is about 500 watt-hours per liter or greater.

18. A lithium secondary battery comprising:
a cathode;
an anode, wherein the anode comprises a silicon-carbon composite material comprising Si particles; and
an electrolyte disposed between the cathode and the anode,
wherein the cathode comprises a cathode active material represented by Formula 3,
wherein the electrolyte comprises a lithium salt; a non-aqueous solvent; a lithium difluoro(oxalate)borate and a monofluorosilane compound represented by Formula 2,
wherein an amount of the lithium difluoro(oxalate)borate is about 2 percent by weight or less, based on the total weight of the electrolyte, and
wherein an amount of the monofluorosilane compound is in a range of about 0.1 percent by weight to about 5 weight percent, based on a total weight of the electrolyte:

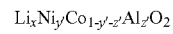

Formula 3

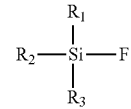

Formula 2 wherein, in Formula 3,
$0.9<x<1.2$, $0.85<y'<0.95$, $0<z'<0.1$, and $0<1-y'-z'<0.15$, and in Formula 2,
$R_1$ is a substituted or unsubstituted linear or branched $C_2$-$C_{30}$ alkyl group or a substituted or unsubstituted $C_6$-$C_{60}$ aryl group; and
$R_2$ and $R_3$ are each independently a substituted or unsubstituted linear or branched $C_1$-$C_{30}$ alkyl group or a substituted or unsubstituted $C_6$-$C_{60}$ aryl group,
wherein a substituent of the substituted $C_1$-$C_{30}$ alkyl group or $C_6$-$C_{60}$ aryl group is a halogen, a methyl group, an ethyl group, a propyl group, an iso-propyl group, an n-butyl group, an iso-butyl group, a t-butyl group, a trifluoromethyl group, a tetrafluoroethyl group, a vinyl group, a propenyl group, a butenyl group, or a combination thereof.

* * * * *